US009052572B2

(12) United States Patent
Urakami et al.

(10) Patent No.: US 9,052,572 B2
(45) Date of Patent: Jun. 9, 2015

(54) CONVERSION ADAPTOR APPARATUS AND INTERCHANGEABLE LENS SYSTEM

(71) Applicant: CANON KABUSHIKI KAISHA, Tokyo (JP)

(72) Inventors: Toshifumi Urakami, Kawasaki (JP); Shoji Kaihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/279,425

(22) Filed: May 16, 2014

(65) Prior Publication Data

US 2014/0248047 A1 Sep. 4, 2014

Related U.S. Application Data

(60) Continuation of application No. 14/021,107, filed on Sep. 9, 2013, now Pat. No. 8,757,905, which is a division of application No. 12/868,208, filed on Aug. 25, 2010, now Pat. No. 8,545,117.

(30) Foreign Application Priority Data

Sep. 2, 2009 (JP) ................................ 2009-202250

(51) Int. Cl.
*G03B 17/14* (2006.01)
*G03B 17/56* (2006.01)
*G03B 17/00* (2006.01)

(52) U.S. Cl.
CPC .............. *G03B 17/14* (2013.01); *G03B 17/565* (2013.01); *G03B 17/00* (2013.01)

(58) Field of Classification Search
CPC ..... G03B 17/14; G03B 17/565; G03B 17/568
USPC .................................... 396/71, 530, 532, 544
See application file for complete search history.

(56) References Cited

U.S. PATENT DOCUMENTS 4,812,865 A  3/1989  Ueyama
7,085,485 B2  8/2006  Sugita et al.
(Continued)

FOREIGN PATENT DOCUMENTS

JP  H4-273671 A  9/1992
JP  2005070711 A  3/2005
(Continued)

OTHER PUBLICATIONS

Canon Digital Photography Forums: http://photography-on-the.net/forum/showthread.php?t=582525 (Oct. 9, 2008).
Japanese Office Action, dated Feb. 24, 2012, issued for Japanese Patent Application No. 2009-202250.

*Primary Examiner* — Christopher Mahoney
(74) *Attorney, Agent, or Firm* — Carter, DeLuca, Farrell & Schmidt, LLP

(57) ABSTRACT

A conversion adapter apparatus is provided that connects a camera body and an interchangeable lens. The conversion adapter apparatus includes a camera body side installation portion to receive a camera body, a lens side installation portion to receive an interchangeable lens, and a first communication contact group provided on the camera body side installation portion and connected to a communication contact group. The conversion adapter apparatus additionally includes a second communication contact group provided on the lens side installation portion and connected to the communication contact group and a conductive member that electrically connects the first communication contact group and the second communication contact group. A position of the first communication contact group around a camera optical axis and a position of the second communication contact group around the camera optical axis are different from each other.

12 Claims, 4 Drawing Sheets

(56) References Cited

U.S. PATENT DOCUMENTS

| | | |
|---|---|---|
| 8,545,117 B2 | 10/2013 | Urakami et al. |
| 8,746,996 B2 * | 6/2014 | Imafuji et al. ............... 396/529 |
| 2007/0047953 A1 | 3/2007 | Kawai |
| 2011/0085792 A1 | 4/2011 | Ueda et al. |

FOREIGN PATENT DOCUMENTS

| | | |
|---|---|---|
| JP | 2005303491 A | 10/2005 |
| JP | 2006-343510 A | 12/2006 |

* cited by examiner

CONVERSION ADAPTOR APPARATUS AND INTERCHANGEABLE LENS SYSTEM

CROSS REFERENCE TO RELATED APPLICATIONS

This application is a continuation of U.S. patent application Ser. No. 14/021,107, filed Sep. 9, 2013, which is a continuation of U.S. patent application Ser. No. 12/868,208, filed Aug. 25, 2010, which claims priority from Japanese Patent Application No. 2009-202250 filed Sep. 2, 2009, the disclosures of each of which are hereby incorporated by reference herein in their entirety.

BACKGROUND OF THE INVENTION

1. Field of the Invention

The present invention relates to a conversion adaptor apparatus and an interchangeable lens system.

2. Description of the Related Art

In response to the desire to decrease the size and weight of digital single reflex lens cameras, in recent years a new type of single lens reflex camera that differs from the conventional single lens reflex camera has been proposed. The new type of single lens reflex camera is not provided with a quick return mirror for guiding the imaging light flux to a viewfinder, and the flange back is shorter than that of a conventional camera. The new type of interchangeable lenses having a short flange back that is compatible with this new type of camera has been proposed. However, these new type of interchangeable lenses cannot easily handle a variety of photographic conditions because there are few models. Therefore, there are cases in which it is desirable to use in the new type of camera the conventional type of interchangeable lenses that have already been introduced to the market and for which there are ample models and quantities. Thus, a conversion adapter for connecting the conventional type of interchangeable lenses with the new type of camera body is necessary. The functions required of this conversion adapter generally include matching the differing mounting profiles of the lenses and the camera body, matching the differing flange backs of the lenses and the camera body, and not hindering the communication system between the lenses and the camera body.

In order to enable communication, which is a necessary function of a conversion adaptor, between the camera body and the interchangeable lens, communication contacts are provided on the conversion adaptor. A conversion adaptor has been proposed in which the positions of the communication contacts connecting the camera body side and the communication contacts connecting the interchangeable lens side of the conversion adaptor are provided at positions around the camera optical axis that are identical. In this conversion adaptor, for example, a conducting member is provided that electrically connects two corresponding connection contacts among the communication contacts that connect to the camera body side (camera body side communication contacts) and the communication contacts connected to the interchangeable lens (lens side communication contacts).

Note that Japanese Patent Laid-Open No. H4-273671, discloses a conversion adaptor in an interchangeable lens system that controls a first lens unit by communicating a control signal having a first signal profile output from the camera body to a first lens unit. This conversion adaptor apparatus enables a second lens unit, which is controlled by control information having a second signal profile that is different from the first signal profile, to connect to the camera body.

However, when the flange back of the camera body of the new type of camera described above and the flange back of the conventional type of lens are close, the conversion adaptor must be made thin. When the conversion adaptor is made thin, providing the camera body side communication contacts and the lens side communication contacts of the conversion adaptor at positions around the camera optical axis that are identical is difficult because they are spatially too close. In addition, in the case in which the camera body side communication contacts and the lens side communication contacts are close to the position of the camera optical axis, the layout of the conducting member that provides electrical conduction between these communication contacts becomes difficult. In addition, the assembly operability of the camera body side communication contacts, the lens side communication contacts, and the conducting member deteriorates.

SUMMARY OF THE INVENTION

The conversion adapter apparatus of the embodiments of the present invention is a conversion adapter apparatus that connects a camera body and an interchangeable lens. The conversion adaptor apparatus includes a camera body side installation portion provided such that a camera body can be attached; a lens side installation portion provided such that an interchangeable lens can be attached; a first communication contact group that is provided on the camera body side installation portion and connects to the communication contact group on the camera body; a second communication contact group that is provided on the lens side installation portion and connects to the communication contact group of the interchangeable lens; and a conductive member that electrically connects the first communication contact group and the second communication contact group. The position of the first communication contact group around the camera optical axis and the position of the second communication contact group around the camera optical axis are different from each other.

Further features of the present invention will become apparent from the following description of exemplary embodiments with reference to the attached drawings.

DESCRIPTION OF THE EMBODIMENTS

Figure 1:
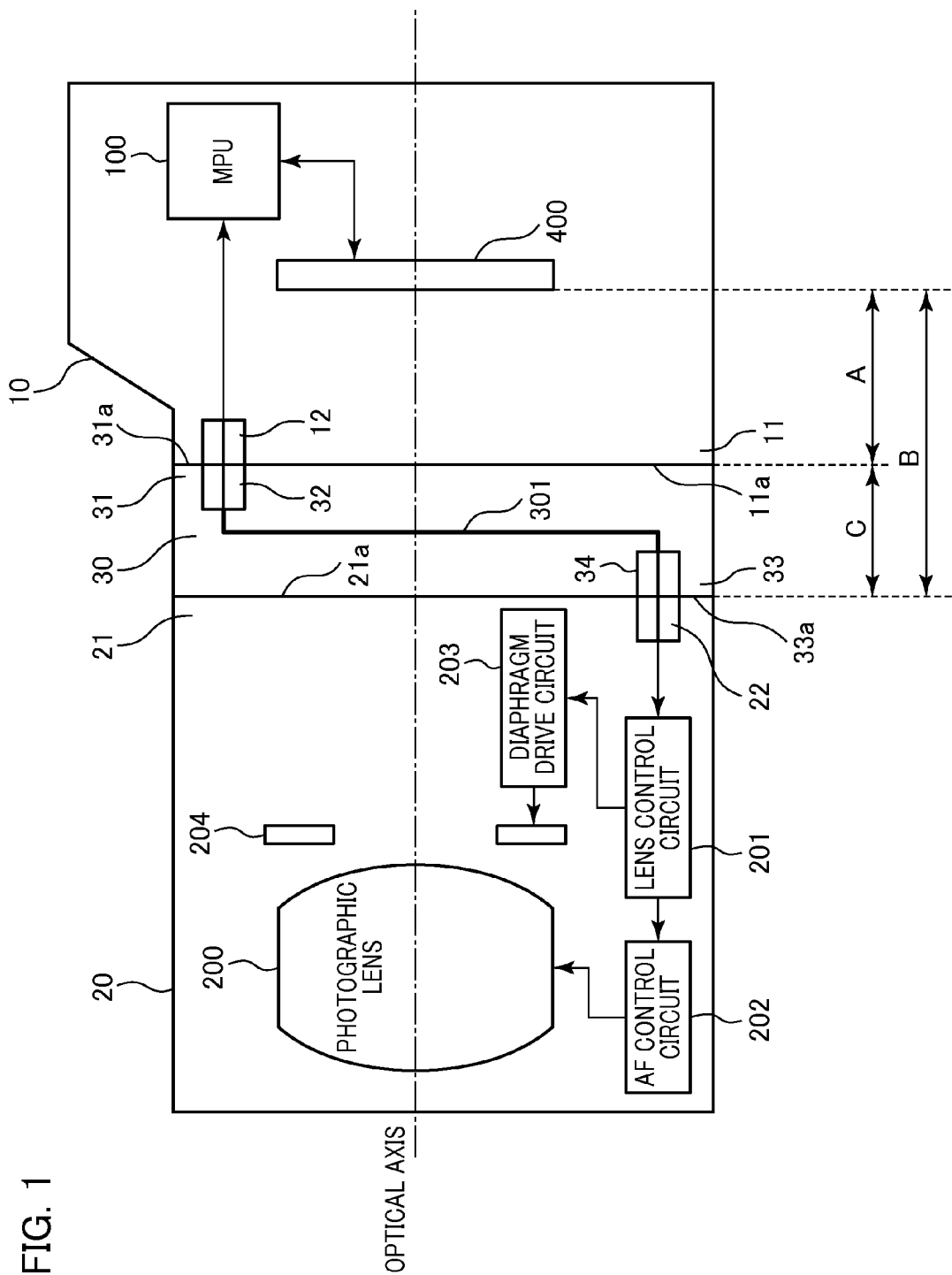
FIG. 1 is a drawing that shows an example of a schematic configuration of a camera overall that is provided with the conversion adaptor.

FIG. 1 is a drawing that shows an example of a schematic configuration of a camera overall that is provided with a conversion adaptor of a first embodiment of the present invention. The camera that is shown in FIG. 1, for example, is a digital camera or a video camera that executes planar image photography or three-dimensional image photography by controlling a plurality of photographic optical systems. The camera shown in FIG. 1 is provided with a camera body 10, an interchangeable lens 20, and a conversion adaptor 30 that connects the camera body 10 and the interchangeable lens 20. The camera body 10 is a new type of camera having a flange back that is shorter than that of a conventional type of camera. The interchangeable lens 20 is attached to the camera body 10 via the conversion adaptor 30. The respective standards for the mounting portions of the camera body 10 and the interchangeable lens 20 are different, and thus, they cannot be directly attached to each other. In addition, the flange backs of the camera body 10 and the interchangeable lens 20 differ. The flange back of the camera body 10 is the distance from a reference plane of the camera body 10 at which the interchangeable lens 20 is installed to the imaging plane of the image pickup element. In addition, the flange back of the interchangeable lens 20 is the distance from a reference plane of the interchangeable lens 20 at which the camera body 10 is installed to the focal point position.

The camera body 10 is provided with a camera body side mounting unit 11, a camera side communication contact group 12, a central processing unit (MPU: Micro Processing Unit) 100, and an image pickup element 400. A quick return mirror and a dedicated focal point detecting unit and the like are not provide in the camera body 10. The MPU 100 is a control unit that carries out operational control of the camera, and executes various processes and instructions on the various elements of the camera system. The image pickup element 400 is an image pickup device that converts a subject image that has been imaged by a photographic optical system to an electronic signal. In the present embodiment, a CMOS (Complementary Metal Oxide Semiconductor) sensor is used as the image pickup element 400. Imaging devices having various configurations, such as a CCD (Charge Coupled Device) type or a CID (Charge-injection Device) type, may be used as the image pickup element 400. After the electrical signals of the image pickup elements 400 have undergone analog/digital (A/D) conversion, various known signal processes are carried out. The camera body side mounting unit 11 is provided at the end portion of the camera body 10 on the subject side (interchangeable lens side). A mounting surface 11a is provided at the end surface of the camera body side mounting unit 11 on the subject side. In addition, the camera side communication contact group 12 is provided on the camera body mounting unit 11.

The interchangeable lens 20 is provided with a lens side mounting unit 21, a lens side communication contact group 22, a photographic lens 200, a lens control circuit 201, an AF control circuit 202, a diaphragm drive circuit 203, and a diaphragm 204. The photographic lens 200 is held so as to be movable in the direction of the optical axis by a lens driving means such as a lens frame or an actuator (not illustrated) depending on the distance to the subject being focused on. Note that although one photographic lens 200 is illustrated for convenience in FIG. 1, the photographic lens 200 actually includes a plurality of lens groups. The lens control circuit 201 carries out communication with the MPU 100, and carries out driving of the photographic lens 200 and the diaphragm 204 in the interchangeable lens 20 via the AF control circuit 202 and the diaphragm drive circuit 203. The AF control circuit 202 is formed, for example, by a stepping motor and carries out adjustments such that the focus lens position in the photographic lens 200 is changed due to the control of the lens control circuit 201 so as to align the focal point of the photographic light flux on the image pickup element. The diaphragm drive circuit 203 has, for example, an automatic iris, and changes the diaphragm 204 according to the control of the lens control circuit 201 to obtain an optical diaphragm value. The lens side mounting unit 21 is provided at the end portion of the interchangeable lens 20 on the camera operator side (camera body side). A mounting surface 21a is provided at the end surface of the lens side mounting unit 21 of the camera operator side. In addition, a lens side communication contact group 22 is provided on the lens side mounting unit 21.

The conversion adaptor 30 is the conversion adaptor apparatus of the present embodiment, and connects the camera body 10 and the interchangeable lens 20. The conversion adaptor 30 is provided with a camera body side installation portion 31, a camera body side communication contact group 32, a lens side installation portion 33, and a lens side communication contact group 34. In the present embodiment, the conversion adaptor 30 has a substantially cylindrical shape, but the shape of the conversion adaptor 30 is not limited to a cylindrical shape. The camera body side installation portion 31 is provided at one end portion of the conversion adaptor 30, and is compatible with the standards for the mounting portion of the cameral body 10. Specifically, the camera body side installation portion 31 is provided such that it can be mounted on the camera body 10. The camera body side installation portion 31 includes a camera body side installation surface 31a at the end surface of the camera body side. In addition, the camera body 10 can be mounted in a configuration in which the mounting surface 11a of the camera body 10 and the camera body side installation surface 31a are in contact. The camera body side communication contact group 32 is provided on the camera body side installation portion 31. The camera body side communication contact group 32 is a first communication contact group, and when the camera body 10 has been installed on the camera body side installation portion 31, it is in contact with the camera side communication contact group 12 provided on the camera body side mounting portion 11.

The lens side installation portion 33 is installed at the end portion opposite to the camera body side installation portion 31, and is compatible with the standard of the mounting portion of the interchangeable lens 20. That is, the lens side installation portion 33 can be mounted on the interchangeable lens 20. The lens side installation portion 33 has a lens side installation surface 33a at the end portion of the interchangeable lens side. In addition, the interchangeable lens 20 is detachably installed in a configuration in which the mounting surface 21a of the interchangeable lens 20 and the lens side installation surface 33a are in contact. The lens side communication contact group 34 is provided on the lens side installation portion 33. The lens side communication contact group 34 is a second communication contact group, and when the interchangeable lens 20 is installed on the lens side installation portion 33, it is in contact with the lens side communication contact group 22 provided on the lens side mounting portion 21.

In addition, in the present embodiment, the camera body side communication contact group 32 and the lens side communication contact group 34 of the conversion adaptor 30 are provided at positions opposed to each other such that the optical axis (camera optical axis) is interposed therebetween. The camera body side communication contact group 32 and the lens side communication contact group 34 are electrically connected by a conducting member 301, such as a flexible printed substrate or a lead wire or the like. Thereby, the MPU 100 can carry out a variety of communication with the lens control circuit 201 inside the interchangeable lens 20 via the camera side communication contact group 12, the camera body side communication contact group 32, the conducting member 301, and the lens side communication contact groups 34 and 22. For example, the MPU 100 can carry out lens attachment and detachment communication, lens data communication, and lens drive communication and the like with the lens control circuit 201.

Here, a symbol "C" shown in FIG. 1 denotes the thickness of the conversion adaptor 30. The thickness is a distance in the direction of the optical axis from the camera body side installation surface 31a to the lens side installation surface 33a. As shown in FIG. 1, when the flange back of the camera body 10 is denoted by "A" and the flange back of the interchangeable lens 20 is denoted by "B", then the relationship C=B−A holds. Specifically, the flange back of the camera body 10 is shorter than the flange back of the interchangeable lens 20, and the thickness of the conversion adaptor corresponds to the difference between the flange back of the camera body 10 and the flange back of the interchangeable lens 20. In the present embodiment, by using a conversion adaptor 30 having a thickness that is the difference C between the flange back A of the camera body 10 and the flange back of the interchangeable lens 20, i.e., C=B−A, both of the flange backs can be aligned (matched).

The interchangeable lens system of the present embodiment can be realized as an interchangeable lens system provided with the conversion adaptor of the present embodiment described above with reference to FIG. 1. According to the conversion adaptor and the interchangeable lens system of the present embodiment, the user can attach an interchangeable lens 20 to the camera body 10 and photograph normally without being affected by differences in the mounting standards and the flange back standards.

Figure 2:
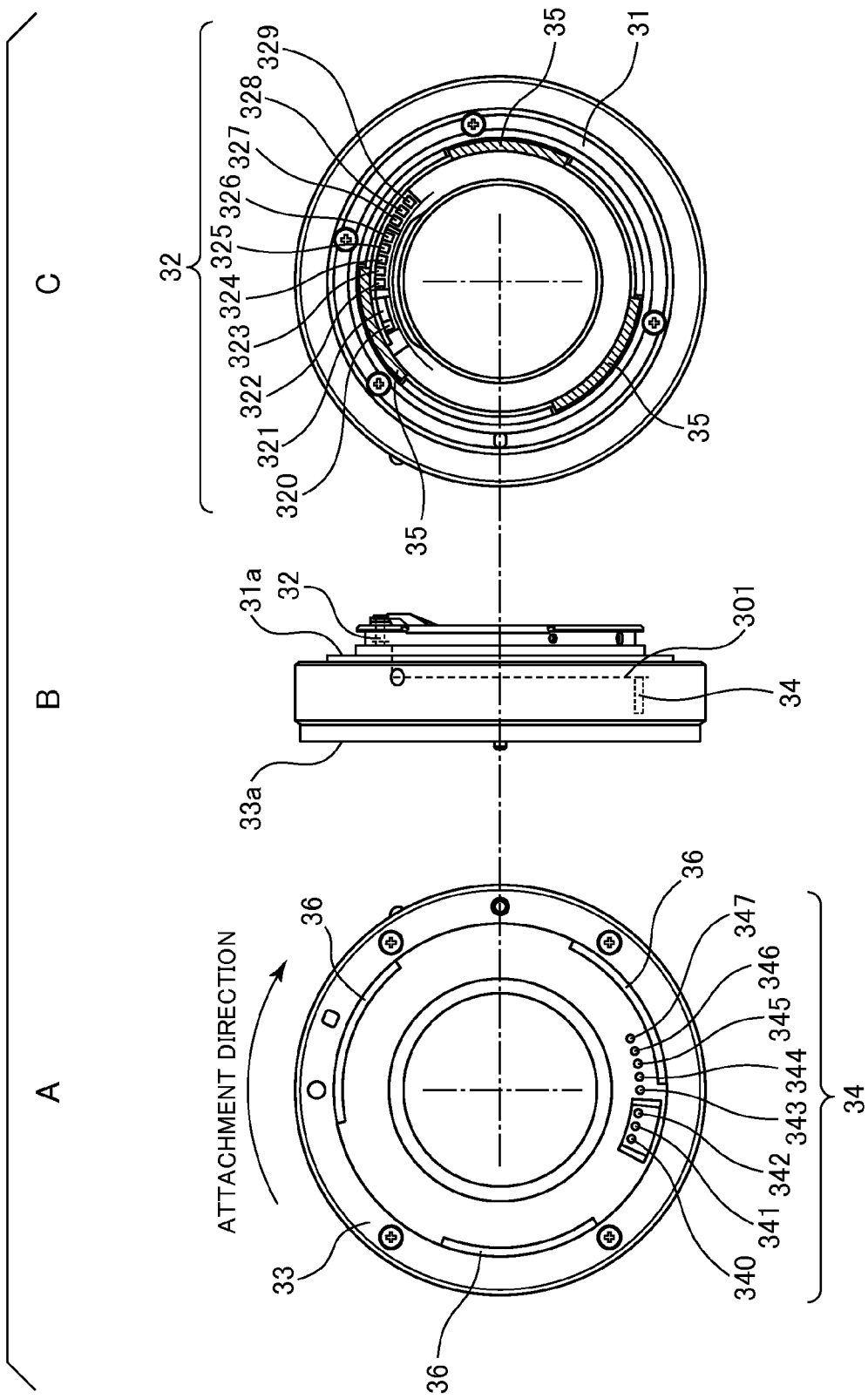
FIG. 2 is a drawing that shows the configuration of the conversion adaptor.

FIG. 2 is a drawing that shows the configuration of the conversion adaptor shown in FIG. 1. A symbol "A" in FIG. 2 denotes a drawing in which the conversion adaptor 30 is viewed from the interchangeable lens side, and principally shows the lens side installation portion 33 of the conversion adaptor 30. A symbol "B" in FIG. 2 denotes a drawing in which the conversion adaptor 30 is viewed from the side. A symbol "C" in FIG. 2 denotes a drawing in which the conversion adaptor 30 is viewed from the camera body side, and principally shows the camera body side installation portion 31 of the conversion adaptor 30. As shown in FIG. 2, a catch portion 35, which is a convexity, is provided at three locations at the outside in a radial direction on the camera body side installation portion 31. By rotating the conversion adaptor 30 to the right when viewed from the interchangeable lens side and the catch portions 35 are hooked on the catch portions of the mounting portion of the camera body (not illustrated), the attachment to the camera body 10 becomes possible. In contrast, as shown in FIG. 2, catch portions 36, which are convexities, are provided at three locations on the inside of the lens side installation portion 33 in the radial direction. By rotating the interchangeable lens 20 to the right when viewed from the interchangeable lens side and catching the catch portions of the mounting portion of the interchangeable lens (not illustrated) on the catch portions 36, the installation of the interchangeable lens 20 becomes possible.

The size of the camera body side installation portion 31 is small in comparison to the size of the lens side installation portion 33. This is because the mounting standards for the camera body side mounting portion 11 and the lens side mounting portion 21 are different, and the camera body side mounting portion 11 is smaller. The camera body side communication contact group 32 is disposed on the camera body side installation portion 31 above the optical axis (above the optical axis when the camera is in the normal position) and is disposed at a first radial distance from the optical axis of the conversion adaptor 30. The camera body side communication contact group 32 includes communication contacts 320 to 329, which are substantially rectangular flat contacts. The communication contacts 320 to 329 correspond to the communication contacts that are included in the camera body side communication contact group 12 on the camera body 10.

The roles of the communication contacts included in the camera body side communication contact group 32 are indicated herein. The communication contact 320 is a lens drive power source communication contact. The communication contact 321 is a lens drive GND contact. Communication contacts 322 to 326 are signal contacts. Specifically, the communication contact 322 is a lens control circuit power source contact, and communication contact 323 is a signal contact for signals from the camera to the lens. The communication contact 324 is a signal contact for signals from the lens to the camera, the communication contact 325 is a contact for synchronizing the communication clocks of the camera and the lens, and the communication contact 326 is the lens control circuit GND contact. Communication contacts 327 to 329 are communication contacts corresponding to mounting standards for a new type of camera. Communication contacts 327 to 329 are second drive power source contacts that differ from the above described communication contact 320 and 321, and are used when carrying out driving that differs from normal lens driving. For example, these are used when carrying out, for example, an operation in which the focal speed is slowed by slowly moving the focus lenses inside the photographic lenses 200 or an operation in which the focal speed is hastened by quickly moving the focus lenses. Communication contact 327 is a second lens drive power source contact, and communication contact 328 is a contact that confirms whether or not a lens that can perform the special operation described above has been correctly attached. Communication contact 329 is the second lens driving GND contact.

In contrast, as shown in FIG. 2, on the lens side installation portion 33, a lens side communication contact group 34 is provided at a position opposed to the camera body side communication contact group 32 (below the optical axis when the camera is in the normal position) such that the optical axis is interposed therebetween and is disposed at a second radial distance from the optical axis of the conversion adaptor 30, where the first radial distance of the camera body side communication contact group 32 is different from the second radial distance of the lens side communication contact group 34. Specifically, the position of the camera body side communication contact group 32 around the optical axis of the camera and the position of the lens side communication contact group 34 around the camera optical axis differ from each other. Because the communication contact group 22 of the interchangeable lens 20 is disposed below the optical axis when the camera is in the normal position, the user can attach interchangeable lens 20 to the conversion adaptor 30 in the same manner as the interchangeable lens attachment operation on a normal camera.

The lens side communication contact group 34 is substantially cylindrical, and is provided with communication contacts 340 to 347, which have a circular contact surface. Communication contacts 340 to 347 can move in the direction of the optical axis, and are supported by flexible members such as springs therein. Communication contacts 340 to 347 correspond to the communication contacts included in the communication contact group 22 of the lens. When external pressure is applied from the lens side installation portion 33 toward the camera body side installation portion 31, communication contacts 340 to 347 move in response to the applied external pressure. When no load is applied, they return to their original position. Therefore, when an interchangeable lens 20 is attached, the communication contacts 340 to 347 can be brought into contact with corresponding communication contacts included in the lens side communication contact group 22 by a constant reaction force. As a result, disconnections between contacts can be prevented, and stable communication can be carried out. Note that if communication contacts 340 to 347 are provided so as to be in contact with the communication contacts of the interchangeable lens 20 while the interchangeable lens 20 is attached to the conversion adaptor 30 by a constant reaction force, the direction of movement of the communication contacts 340 to 347 may be in a radial direction. In addition, the communication contacts 340 to 347 may be immovable.

The roles of communication contacts 340 to 347 are indicated herein. Communication contacts 340 to 342 are drive power source contacts. Specifically, communication contact 340 is a lens drive power source contact and communication contact 341 is a contact for confirming the presence or absence of lens attachment. Communication contact 342 is a lens drive GND contact. Communication contacts 343 to 347 are signal contacts. Specifically, communication contact 343 is a lens control circuit power source contact, communication contact 344 is a signal contact for signals from the camera to the lens, and communication contact 345 is a signal contact for signals from the lens to the camera. In addition, communication contact 346 is a contact for synchronizing the communication clocks of the camera and the lens, and communication contact 347 is a lens control circuit GND contact.

The communication contacts (first communication contacts) included in the camera body side communication contact group 32 and the communication contacts (second communication contacts) included in the lens side communication contact group 34 and corresponding to the first communication contacts are electrically connected by the conducting member 301. For example, the communication contact 320 is connected to the communication contact 340, which is the corresponding communication contact, and communication contact 321 is connected to communication contacts 341 and 342, which are the corresponding communication contacts. In addition, communication contact 322 is connected to communication contact 343, which is the corresponding communication contact, and communication contact 323 is connected to communication contact 344, which is the corresponding communication contact. In addition, communication contact 324 is connected to communication contact 345, which is the corresponding communication contact, and communication contact 325 is connected to the communication contact 346, which is the corresponding communication contact. In addition, communication contact 326 is connected to communication contact 347, which is the corresponding communication contact. Note that the communication contacts corresponding to communication contact 327 and 329 are not provided on the lens side installation portion 33.

Here, assume the case in which the camera body side communication contact group 32 and the lens side communication contact group 34 are disposed such that their positions around their camera optical axes are identical (for example, both contact groups are disposed at position below the optical axis when the camera is in the normal position). In this case, because the conversion adaptor 30 is thin and the layout volume of the lens side communication contact group 34 in the direction of the optical axis is large, the camera body side communication contact group 32 and the lens side communication contact group 34 are close. As a result, the disposition layout of the camera body side communication contact group 32 and the lens side communication contact group 34 becomes difficult. In addition, even if we suppose that the camera body side communication contact group 32 and the lens side communication contact group 34 can be laid out, the conducting member 301 that connects the camera body side communication contact group 32 and the lens side communication contact group 34 becomes short. As a result, the disposition of the communication contact groups, the disposition of the conducting member 301, and the assembly operability of the communication contact groups and the conducting member 301 become unfavorable.

In contrast, in the conversion adaptor of the present embodiment, the position of the camera body side communication contact group 32 around the camera optical axis and the position of the lens side communication contact group 34 around the camera optical axis are disposed so as to be different from each other. Specifically, in the conversion adaptor of the present embodiment, the camera body side communication contact group 32 and the lens side communication contact group 34 are disposed so as to oppose each other with the optical axis interposed therebetween. Therefore, according to the conversion adaptor of the present embodiment, an interval having a prescribed length can be established between the camera body side communication contact group 32 and the lens side communication contact group 34. As a result, the layout of the camera body side communication contact group 32 and the lens side communication contact group 34 can be improved. In addition, the layout of the conducting member 301 that provides conduction between the camera body side communication contact group 32 and the lens side communication contact group 34, and the assembly operability of the camera body side communication contact group 32, the lens side communication contact group 34, and the conducting member 301 can be improved.

Note that in the present embodiment, the communication contacts 327 through 329 are second drive power source contact points, but communication contacts 327 to 329 may be additional signal contact points to enable communicating more information than is conventionally communicated between the camera body 10 and the conversion adaptor 20. In addition, the number of the second drive power source contact points and the additional signal contacts described above may be larger or smaller than the number of communication contacts 327 to 329 shown in FIG. 2. In addition, the disposition locations for the communication contacts 327 to 329 may be, for example, between the power source contact points and the signal contact points. In addition, the camera body side communication contact group 32 may have a structure in which the communication contacts 327 to 329 are not provided.

In the present embodiment, the camera body side communication contact group 32 of the conversion adaptor 30 is disposed above the optical axis when the camera is in the normal position and the lens side communication contact group 34 is disposed below the optical axis when the camera is in the normal position, and thus, there are the following merits for the camera body side. Specifically, in a new type camera, the electronic viewfinder, the display member, and the operation member and the like disposed so as to be concentrated above the mount, and the electronic mounting system also is disposed so as to be concentrated above the mount. Therefore, the camera body side communication contact group 32 is disposed above the optical axis when the camera is in the normal position, and thereby, the layout efficiency of the electronic mounting system is improved.

Figure 3:
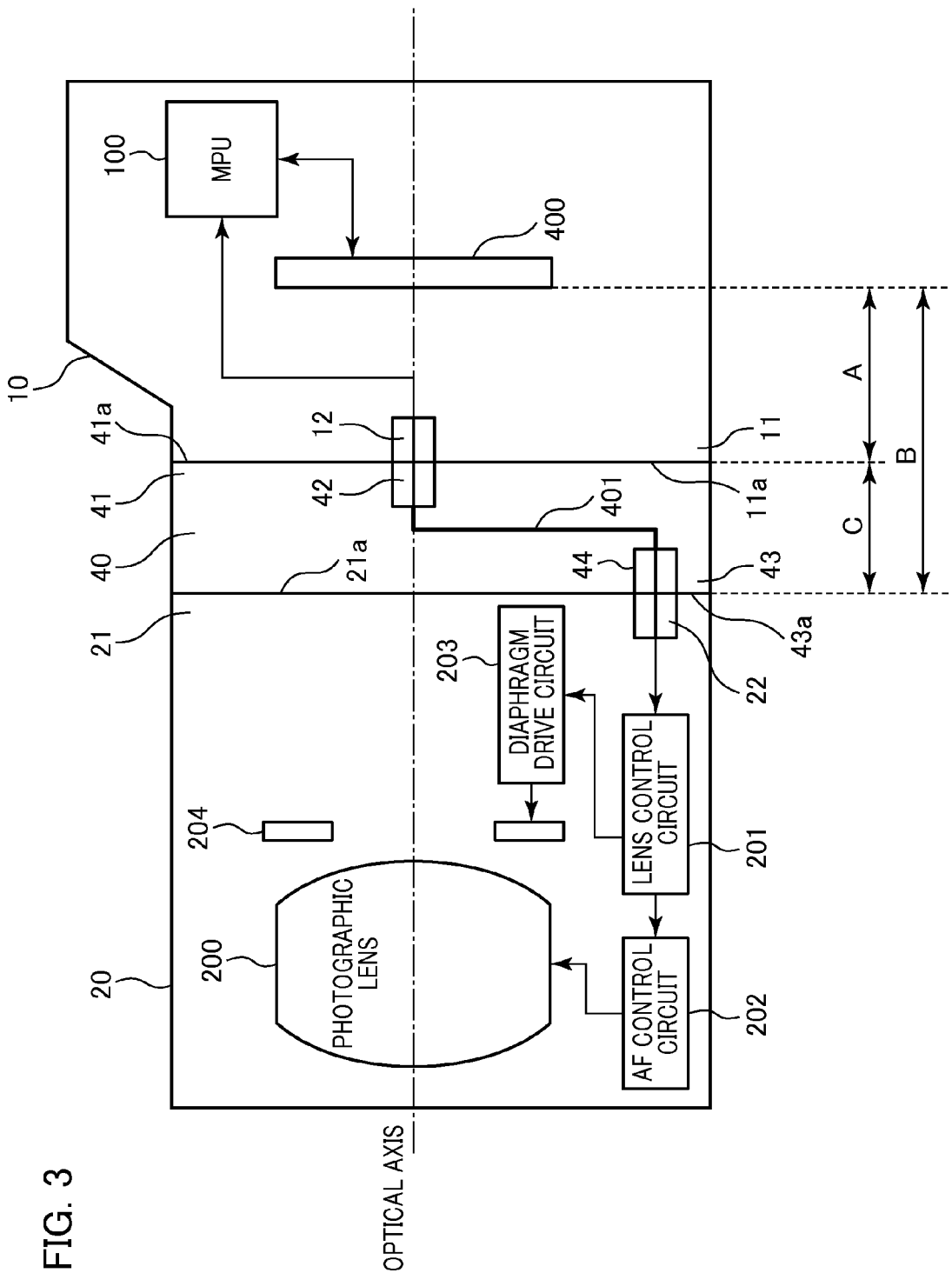
FIG. 3 is a drawing that shows an example of a schematic configuration of a camera overall that is provided with a conversion adaptor.

FIG. 3 is a drawing that shows an example of an overall schematic configuration of the camera that is provided with a conversion adaptor apparatus of a second embodiment of the present invention. Among the constituent portions provided by the camera shown in FIG. 3, the constituent portions provided by the camera shown in FIG. 1 denoted by identical reference numerals have a function that is identical to the constituent portions that are provided by the camera shown in FIG. 1. The camera shown in FIG. 3 is provided with a camera body 10, an interchangeable lens 20, and a conversion adaptor 40 that connects the camera body 10 and the interchangeable lens.

The point of difference between the conversion adaptor 40 and the conversion adaptor 30 shown in FIG. 1 is that the camera body side communication contact group 42 of the camera body side installation portion 41 is disposed on the right side of the optical axis, and otherwise, the configuration and functions are identical to the configuration and function provided by the conversion adaptor 30. Specifically, the camera body side installation portion 41 provided by the conversion adaptor 40 has a function that is identical to the function of the camera body side installation portion 31 that is shown in FIG. 1. In addition, the camera body side communication contact group 42 has a function that is identical to the function of the camera body side communication contact group 32 that is shown in FIG. 1. In addition, the lens side installation portion 43 has a function that is identical to the function of the lens side installation portion 33 that is shown in FIG. 1. In addition, the lens side communication contact group 44 has a function that is identical to the function of the lens side communication contact group 34 that is shown in FIG. 1. The camera body side installation portion 41 has camera body side installation surface 41a on the end surface on the camera body side. The camera body side installation surface 41a has a function that is identical to the function of the camera body side installation surface 31a that is shown in FIG. 1. The lens side installation portion 33 has a lens side installation surface 43a on the end surface on the interchangeable lens side. The lens side installation surface 43a has a function that is identical to the function of the lens side installation surface 33a that is shown in FIG. 1. In addition, the camera body side communication contact group 42 and the lens side communication contact group 44 are electrically connected via the conducting member 401, which has a function that is identical to that of the conducting member 301 that is shown in FIG. 1. The interchangeable lens system of the present embodiment can be realized as an interchangeable lens system provided with the conversion adaptor 40 that is shown in FIG. 3.

Figure 4:
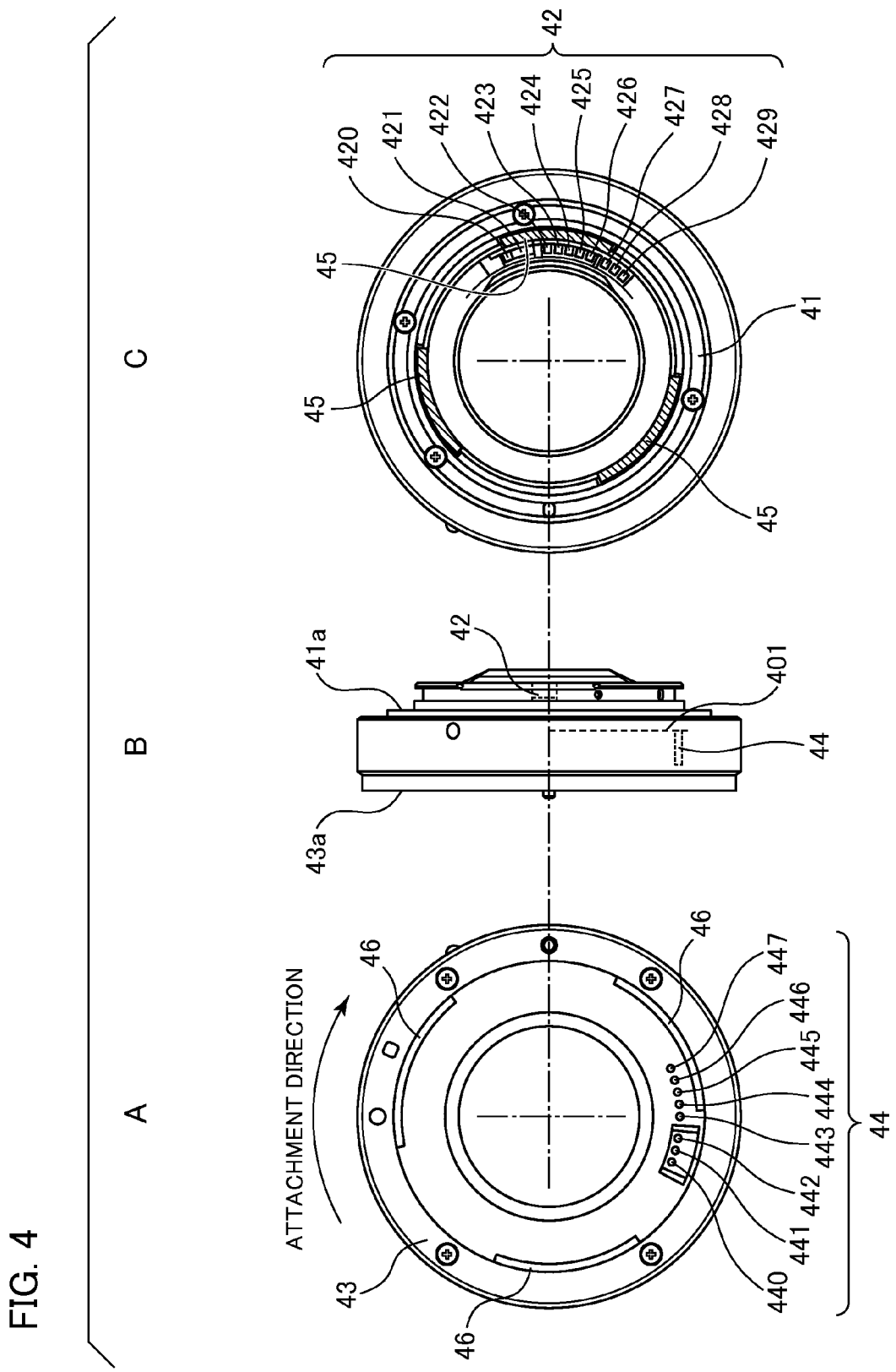
FIG. 4 is a drawing that shows the configuration of a conversion adaptor.

FIG. 4 is a drawing that shows the configuration of the conversion adaptor shown in FIG. 3. A symbol "A" in FIG. 4 denotes a drawing in which the conversion adaptor 40 is viewed from the interchangeable lens side. A symbol "B" in FIG. 4 denotes a drawing in which the conversion adaptor 40 is viewed from the side. A symbol "C" in FIG. 4 denotes a drawing in which the conversion adaptor 40 is viewed from the camera body side. The function of the communication contacts (communication contacts 420 to 429) provided by the camera body side communication contact group 42 that is shown in FIG. 4 is identical to the function of the communication contacts (communication contacts 320 to 329) provided by the camera body side communication contact group 32 that is shown in FIG. 2. In addition, the function of the communication contacts (communication contacts 440 to 447) provided by the lens side communication contact group 44 that is shown in FIG. 4 is identical to the function of the communication contacts (communication contacts 340 to 347) provided by the lens side communication contact group 34 that is shown in FIG. 2. In addition, the catch portion 46 that is shown in FIG. 4 has a function that is identical to the catch portion 36 that is shown in FIG. 2, and the catch portion 45 that is shown in FIG. 4 has a function that is identical to that of the catch portion 45 that is shown in FIG. 2. Note that the camera body side communication contact group 12 provided by the camera body 10 is disposed on the right side of the optical axis, when the camera is in the normal position, such that the camera body 10 is in contact with the camera body side communication contact group 42 when the camera body 10 has an interchangeable lens 40 attached thereto.

In the second embodiment of the present invention, as shown in FIG. 4, the camera body side communication contact group 42 of the conversion adaptor 40 is disposed on the right side of the optical axis (the right side of the optical axis when viewed from the photographer's side while the camera is in the normal position). In addition, as shown in FIG. 4, the lens side communication contact group 44 of the conversion adaptor 40 is disposed below the optical axis (below the optical axis while the camera is in the normal position). Specifically, the camera body side communication contact group 42 and the lens side communication contact group 44 are provided at positions separated by 90 degrees around the optical axis of the camera (in the example shown in FIG. 4, a position offset by an approximately ¼ rotation in the peripheral direction of a circle centered on the optical axis). Therefore, according to the conversion adaptor 40, an interval of a predetermined distance can be established between the camera body side communication contact group 42 and the lens side communication contact group 44. As a result, the layout of the camera body side communication contact group 42 and the lens side communication contact group 44 can be improved. In addition, the layout of the conducting member 401 that provides electrical conduction between the camera body side communication contact group 42 and the lens side communication contact group 44, and the assembly operability for the camera body side communication contact group 42, the lens side communication contact group 44, and the conducting member 401 can be improved.

In addition, there are the following merits in the case in which the camera body 10 is one that is compatible with a new type of camera in which the battery, which is the power source, is disposed inside a grip that is on the right of the optical axis. Specifically, in the second embodiment of the present invention, because the camera body side communication contact group 12 of the camera body 10 is disposed to the right of the optical axis, the camera body side communication contact group 12 is disposed at a position in proximity to the power source, and the layout efficiency of the electrical mounting system is thereby improved.

The present invention has been described in detail based on preferred embodiments thereof, but the present invention is not limited by specific embodiments, and the present invention includes various forms within a range that does not depart from the spirit of the present invention. Portions of the embodiments described above may be suitably combined. For example, the position at which the space between the camera body side communication contact group and the lens side communication contact group that are provided by the conversion adaptor of the present invention may be a position at which an interval having a predetermined distance between the camera body side communication contact group and the lens side communication contact group can be established. Specifically, the camera body side communication contact group and the lens side communication contact group provided by the conversion adaptor apparatus may be provided at a position separated by a freely chosen number of degrees of separation around the optical axis of the camera.

In addition, in the present embodiment, an example is provided in which the mounting standard for the camera body and the mounting standard for the interchangeable lens differ, including the size of the mount, but the sizes of both mounts may be identical. In this case, only the size of the camera body side installation portion and the lens side installation portion of the conversion adaptor are identical, and this does not depart from the spirit of the invention with respect to the disposition of the communication contact groups.

According to the conversion adaptor apparatus of the present invention explained above, the attachment of an interchangeable lens to a camera body having a different flange back becomes possible, and at the same time, the layout of the communication contacts on the camera body side and the communication contacts on the lens side of the conversion adaptor can be improved. In addition, according to the conversion adaptor apparatus of the present invention, the layout of the conducting member that provides electrical conduction between the corresponding communication contacts provided by the conversion adaptor apparatus, and the assembly operability for the communication contacts and the conducting member can be improved.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A conversion adaptor apparatus that connects a camera body and an interchangeable lens, the conversion adaptor apparatus comprising:
   a camera body side installation portion provided such that a camera body can be attached;
   a lens side installation portion provided such that an interchangeable lens can be attached;
   a first communication contact group that is provided on the camera body side installation portion at a first radial distance from a central axis of the conversion adaptor apparatus and connects to a communication contact group of the camera body;
   a second communication contact group that is provided on the lens side installation portion at a second radial distance from the central axis of the conversion adaptor apparatus and connects to a communication contact group of the interchangeable lens, wherein the first and second radial distances are different from each other; and
   a conductive member that electrically connects the first communication contact group and the second communication contact group,
   wherein a number of contacts included in the first communication contact group is larger than a number of contacts included in the second communication contact group by providing contacts, which do not correspond to the second communication contact group and are located at one end of the first communication contact group, and the first radial distance is shorter than the second radial distance.

2. The conversion adaptor apparatus according to claim 1, wherein a radius defined from the central axis of the conversion adaptor apparatus to the first communication contact group and a radius defined from the central axis of the conversion adaptor apparatus to the second communication contact group form a non-zero angle.

3. The conversion adaptor apparatus according to claim 2, wherein the first communication contact group is provided above the camera optical axis when the camera is in the normal position.

4. The conversion adaptor apparatus according to claim 1, wherein the first communication contact group and the second communication contact group are provided at positions offset by 90 degrees around the camera optical axis.

5. The conversion adaptor apparatus according to claim 4, wherein the communication contact group of the camera body that is in contact with the first communication contact group is provided at a position in proximity to a power source of the camera.

6. The conversion adaptor apparatus according to claim 1, wherein the second communication contact group is provided so as to be in contact with the communication contacts of the interchangeable lens due to a predetermined reaction force when the interchangeable lens is attached to the conversion adaptor apparatus.

7. The conversion adaptor apparatus according to claim 1, wherein a flange back of the camera body is shorter than a flange back of the interchangeable lens, and the thickness of the conversion adaptor apparatus is the difference between the flange back of the camera body and the flange back of the interchangeable lens.

8. The conversion adaptor apparatus according to claim 1, wherein a center axis of the conversion adaptor apparatus corresponds to an optical axis of the interchangeable lens attached to the conversion adaptor apparatus.

9. The conversion adaptor apparatus according to claim 1, wherein the first communication contact group comprises at least a lens drive power source contact and a second drive power source contact which is different from the lens drive power source contact.

10. The conversion adaptor apparatus according to claim 9, wherein the second drive power source contact is provided at the end of the first communication contact group.

11. An interchangeable lens system provided with a conversion adaptor apparatus that connects a camera body and an interchangeable lens, wherein the conversion adaptor apparatus comprises:
    a camera body side installation portion provided such that a camera body can be attached;
    a lens side installation portion provided such that an interchangeable lens can be attached;
    a first communication contact group that is provided on the camera body side installation portion at a first radial distance from a central axis of the conversion adaptor apparatus and connects to a communication contact group of the camera body;
    a second communication contact group that is provided on the lens side installation portion at a second radial distance from the central axis of the conversion adaptor apparatus and connects to a communication contact group of the interchangeable lens, wherein the first and second radial distances are different from each other; and
    a conductive member that electrically connects the first communication contact group and the second communication contact group, wherein a number of contacts included in the first communication contact group is larger than a number of contacts included in the second communication contact group by providing contacts, which do not correspond to the second communication contact group and are located at one end of the first communication contact group, and the first radial distance is shorter than the second radial distance.

12. The interchangeable lens system according to claim 11, wherein a center axis of the conversion adaptor apparatus corresponds to an optical axis of the interchangeable lens attached to the conversion adaptor apparatus.

* * * * *